United States Patent [19]

Beletic et al.

[11] Patent Number: 5,706,211
[45] Date of Patent: Jan. 6, 1998

[54] MESSAGE COMMUNICATIONS SYSTEM

[75] Inventors: John D. Beletic, Dallas; Vick T. Cox; John A. Davis, both of Plano, all of Tex.

[73] Assignee: Motorola, Inc., Schabumburg, Ill.

[21] Appl. No.: 396,499

[22] Filed: Mar. 2, 1995

[51] Int. Cl.[6] .................. H04Q 7/00; G08B 5/22
[52] U.S. Cl. .................. 364/514 R; 340/311.1; 340/825.44; 379/56; 379/63; 379/67; 379/89
[58] Field of Search .................. 340/311.1, 825.44; 364/514 R; 379/56, 57, 63, 67, 89, 217, 58

[56] References Cited

U.S. PATENT DOCUMENTS

| | | | |
|---|---|---|---|
| 2,921,141 | 1/1960 | Enikeieff | 340/311.1 |
| 5,117,460 | 5/1992 | Berry et al. | 340/311.1 X |
| 5,128,981 | 7/1992 | Tsukamoto et al. | 379/58 |
| 5,140,626 | 8/1992 | Ory et al. | 379/57 |
| 5,457,732 | 10/1995 | Goldberg | 379/57 |
| 5,535,434 | 7/1996 | Siddoway et al. | 340/825.44 X |
| 5,600,703 | 2/1997 | Dang et al. | 379/57 |
| 5,604,794 | 2/1997 | Vogel et al. | 379/67 |

*Primary Examiner*—Edward R. Cosimano
*Attorney, Agent, or Firm*—Pablo Meles

[57] ABSTRACT

A messaging system (10) is provided that comprises an RF transmission system (12). The RF transmission system (12) comprises an RF control system (14) which receives message traffic from a messaging gateway system (20). The messaging gateway system (20) receives messages in a variety of protocols from remote messaging system (30). The messaging gateway system (20) translates the messages received from remote messaging system (30) and constructs messages to be delivered to subscriber devices (28) through the RF transmission system (12). A subscriber device (28) can issue commands that are transmitted to the remote messaging system (30) or to remote system controller (32) controlling a remote-controlled system (34).

19 Claims, 3 Drawing Sheets

MESSAGE COMMUNICATIONS SYSTEM

TECHNICAL FIELD OF THE INVENTION

This invention relates in general to the field of communications systems and more particularly to an improved two-way paging and messaging system and method of operation.

BACKGROUND OF THE INVENTION

One of the most convenient forms of wireless communication involves the use of radio frequency transmission systems which transmit short messages to hand-held subscriber devices referred to as "pagers." Advances in data compression techniques have allowed for the development of paging systems that include the ability to transmit short voice messages to subscriber devices that include a voice playback capability. Accordingly, a user of a paging system now has the ability to receive both alphanumeric messages and voice messages through the conventional paging transmission network.

Although the user of a communications system now has the ability to receive a variety of types of messages on his subscriber device, there has been very little, if any, attention paid to the systems necessary to gather the new voice messaging traffic or to the possibility of allowing the user to control messages directed to him or other aspects of the communications system.

Accordingly, a need has arisen for a wireless communications system that provides a user with control over the messaging traffic directed to him and which provides a gateway for messaging traffic to reach such a subscriber.

Further, said wireless communications system could then provide the user with control over a wide range of electronically-controllable devices using both wireless and wired communication.

SUMMARY OF THE INVENTION

In accordance with the teachings of the present invention, a wireless communications system is provided that substantially eliminates or reduces problems associated with prior systems and methods of operation.

According to one embodiment of the present invention, a communications system is provided that comprises a radio frequency transmission system operable to communicate with at least one subscriber device. The radio frequency transmission system is coupled to a messaging gateway system. The messaging gateway system is coupled to a remote messaging system. The messaging gateway is operable to receive, for example, voice messages or notification of a voice message deposited in the remote messaging system intended for a user of a subscriber device from the remote messaging system. The messaging gateway is further operable to translate the messages received from the remote messaging system into a protocol which is able to be transmitted to the subscriber device by the radio frequency transmission system.

According to another embodiment of the present invention, the subscriber device is operable to generate messages that may be returned through the radio frequency transmission system to the messaging gateway system. The messaging gateway system may then either return the message to a remote messaging system in communication with the messaging gateway system or direct the message from the subscriber device to an alternate device through the radio frequency transmission system. Using the return communication pathway, the user of a subscriber device can manipulate a voice mailbox within a remote voice messaging system. In the alternative, the user of a subscriber device can direct messages to other subscriber devices or can direct control signals to systems controlled by remote system controllers.

BRIEF DESCRIPTION OF THE DRAWINGS

A more complete understanding of the teachings of the present invention may be acquired by referring to the accompanying FIGUREs. in which like reference numbers indicate like features and wherein.

DETAILED DESCRIPTION OF THE INVENTION

System Architecture

Figure 1:
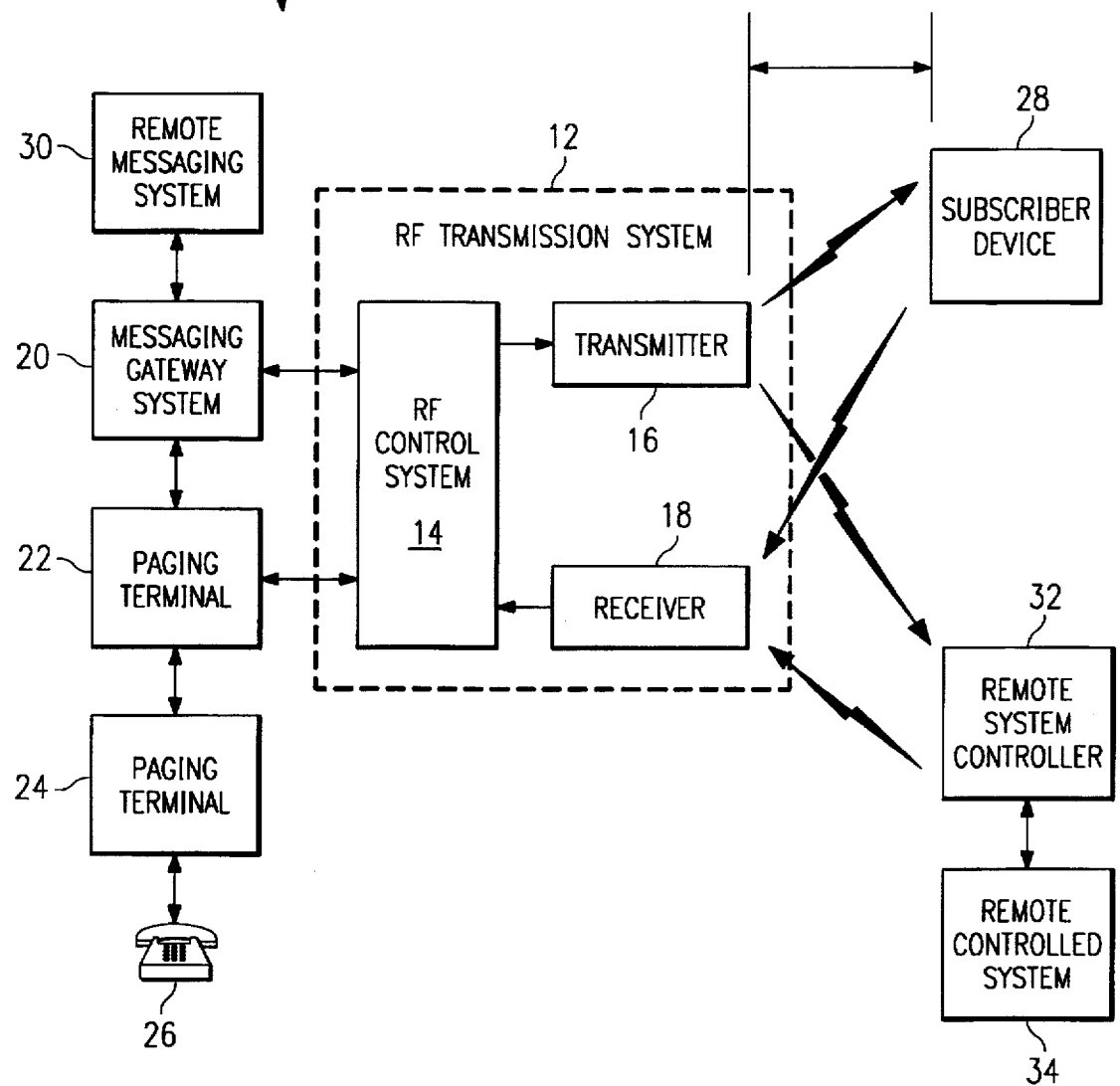
FIG. 1 is a block diagram of a messaging system constructed according to the teachings of the present invention.

FIG. 1 illustrates a block diagram of a communications system indicated generally at 10 which comprises a radio frequency (RF) transmission system 12. RF transmission system 12 comprises an RF control system 14 which communicates with a transmitter 16 and a receiver 18. RF control system 14 receives and transmits messaging traffic to and from a messaging gateway system 20 and a paging terminal 22. Paging terminal 22 may be coupled to other paging terminals such as paging terminal 24 in a paging terminal network. This network may be coupled through conventional telecommunications links to telephones such as telephone 26 shown in FIG. 1.

According to the conventional operation of paging systems, a caller may use telephone 26 to call up a paging terminal such as paging terminal 24 to leave a message for a user of the system 10. The message left by such a caller may be a numeric message entered using dual tone multi-frequency signals from the telephone 26. In addition, a caller may leave an alphanumeric message using conventional paging protocols. In either case, the message is transferred from paging terminal 24 to paging terminal 22 or the message is transferred from paging terminal 22 to the RF control system 14 which locates the intended recipient of the message and transmits the message to an appropriate transmitter such as transmitter 16 shown in FIG. 1. The transmitter 16 then transmits the message using radio frequency signals to a subscriber device 28. Once the message is received, the subscriber device 28 transmits an acknowledgment to the receiver 18 which transfers such acknowledgment to the RF control system 14.

The RF control system 14 can also receive messaging traffic from the messaging gateway system 20. The messaging gateway system 20 is coupled to a plurality of remote messaging systems such as remote messaging system 30 shown in FIG. 1. Remote messaging system 30 may comprise, for example, a voicemail system operated by a company or local exchange carrier or other organization. The messaging systems exemplified by remote messaging system 30 may comprise a variety of voice mail systems, electronic mail systems, facsimile transmission systems or other messaging facilities. The remote messaging system 30 transmits copies of messages or notifications of messages deposited in the system to the messaging gateway system 20 using a variety of message transfer protocols.

For example, remote messaging system 30 may communicate with messaging gateway system 20 using the audio messaging interchange specification digital protocol (AMIS-Digital) or other public or proprietary message transfer protocols. The messaging gateway system 20 translates the voice messages received from the remote messaging system 30 into a protocol understood by the RF control system 14. The voice message may then be transferred from the RF control system 14 to the transmitter 16 where it can be transmitted using radio frequency signals to the subscriber device 28. According to one embodiment of the present invention, the subscriber device 28 may include both data display capability and voice playback capability. One embodiment of subscriber device 28 will be described more completely with reference to FIG. 4 herein.

An important technical advantage of the present invention inheres in the fact that subscriber device 28 also has the capability to transmit signals to RF control system 14 through receiver 18 which can be used to direct the actions of the remote messaging system 30. In this manner, a user of subscriber device 28 can instruct the remote messaging system 30 which, as described previously may comprise, for example, a voicemail system. A user of the subscriber device 28 can instruct the remote messaging system 30 to save messages, reply to messages, redirect messages, send new messages, hold messages, transmit messages that are currently on hold, or to configure restricted delivery of messages. In this manner, the subscriber device 28 is a remote control unit for a voice mailbox associated with the user of the subscriber device 28.

According to another aspect of the present invention, the subscriber device 28 can transmit signals to the RF control system 14 through the receiver 18 that are intended for a remote system controller 32 shown in FIG. 1. The remote system controller 32 is coupled to and controls a remote-controlled system 34. The remote system controller 32 comprises circuitry similar to a subscriber device such as subscriber device 28 in that it is able to communicate with the RF control system 14 through the transmitter 16 and receiver 18. The remote system controller 32 receives commands initially generated by the subscriber device 28 from the transmitter 16 and instructs the remote-controlled system 34 responsive to the commands received. The commands are transmitted from the subscriber device 28 to the messaging gateway system 20 which interprets the commands and constructs a message for delivery to the remote system controller 32.

For example, if the remote-controlled system 34 were a home alarm system, the remote system controller 32 could arm or disarm the alarm responsive to commands received via the RF transmission system 12 from the subscriber device 28 through the messaging gateway system 20 which will encrypt sensitive data such as passwords. As shown in FIG. 1, the remote system controller 32 also has the ability to generate messages back to subscriber device 28 through messaging gateway system 20 by transmitting them to receiver 18. In this manner, the remote system controller 32 can acknowledge the accomplishment of tasks that it was instructed to do. In addition, the remote system controller 32 can generate messages on its own.

For example, to continue the prior example, if the remote-controlled system 34 comprised a home alarm system and the alarm was triggered, the remote system controller 32 could generate a message that could be sent to the subscriber device 28 through the RF transmission system 12 and through messaging gateway system 20 to inform the user of subscriber device 28 that the alarm had been triggered.

Messaging Gateway System

Figure 2:
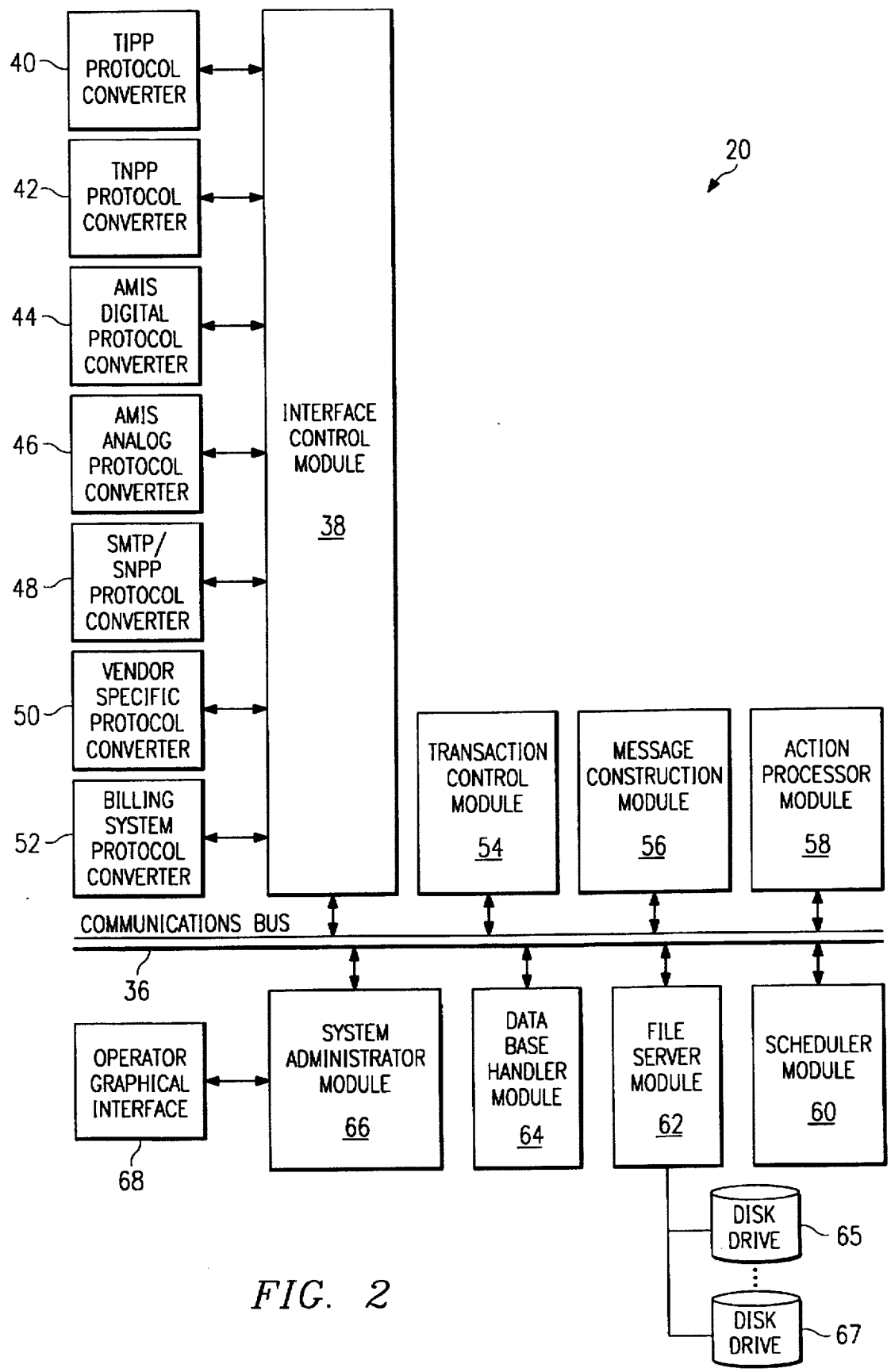
FIG. 2 is a block diagram of a messaging gateway system constructed according to the teachings of the present invention.

FIG. 2 is a schematic block diagram illustrating in greater detail the construction of messaging gateway system 20. The components of messaging gateway system 20 communicate via a communications bus 36. In general, the messaging gateway system 20 may comprise a plurality of software processes operating in a UNIX-based environment. The messaging gateway system 20 comprises an interface control module 38 that communicates with other modules via the communications bus 36. The interface control module arbitrates between transmissions received from various converter modules. Interface control module 38 is coupled to a TIPP protocol converter 40. The TIPP protocol converter 40 functions to receive messages from remote messaging systems that use the TIPP protocol. In addition, the TIPP protocol may be used by paging terminals such as paging terminal 22 to transmit messages to the messaging gateway system 20.

Similarly, the interface control module 38 is coupled to a TNPP protocol converter 42 which similarly functions to convert messages received in the TNPP protocol. The interface control module 38 is also coupled to an AMIS-Digital protocol converter 44 which functions to receive and convert messages received in the AMIS-Digital protocol. The interface control module 38 is also coupled to an AMIS-Analog protocol converter 46 which operates in like manner to convert messages received from remote messaging systems in the AMIS-Analog protocol. An SMTP/SNPP protocol converter 48 functions to receive and convert messages from remote messaging systems that utilize the SMTP/SNPP protocol. Other protocols may also be supported as exemplified by vendor-specific protocol converter 50. These protocols are similarly received and converted by protocol converter 50 and the messages are then transmitted to interface control module 38. A billing system protocol converter 52 receives queries and information from an external billing system for use by the remainder of messaging gateway system 20 such as when a subscriber requests billing information to be delivered to the subscriber device 28.

Overall control of the operations taken by messaging gateway system 20 is controlled by a transaction control module 54 which communicates with remaining modules through communications bus 36. Under control of the transaction control module 54, a message construction module 56 operates to parse the messages received from remote messaging systems 30 and to construct the messages to be transmitted to the RF transmission system 12 for delivery to subscriber device 28. In addition, message construction module 56 functions to receive messages through the RF transmission system 12 from subscriber device 28 or remote-controlled system 34 and to construct appropriate messages for delivery to remote messaging systems or subscriber device 28 through the interface control module 38 and the protocol converter systems 40 through 52.

The routines for performing the various activities of the messaging gateway system 20 are implemented by an action processor module 58 which causes the remaining modules to perform their required functions. A scheduler module 60 is coupled to communications bus 36 and operates to manage timed events such as the postponed delivery of messages. A file server module 62 is also coupled to communications bus 36. File server module 62 manages file storage space which may comprise, for example, storage space on disk drives 65 and 67. File server module 62 communicates with remaining modules through communications bus 36 and operates to provide large amounts of file storage space for the remaining systems within messaging gateway system 20.

A database handler module 64 is also coupled to communications bus 36. The identity of remote messaging systems and the users associated with the remote messaging systems are organized, maintained and updated using database handler module 64. In addition, database handler module 64 operates to manage the files stored by file server module 62 for each subscriber. The database handler module 64 stores packets of information that are used by the other modules to track the progress of messaging transactions occurring within messaging gateway system 20.

A system administrator module 66 provides access to messaging gateway system 20 through an operator graphical interface 68. System administrator module 66 allows for maintenance of the software systems operating within messaging gateway system 20. In addition, the system administrator module 66 provides a method of altering the information managed by database handler module 64. Also, system diagnostics can be performed.

Remote System Controller

Figure 3:
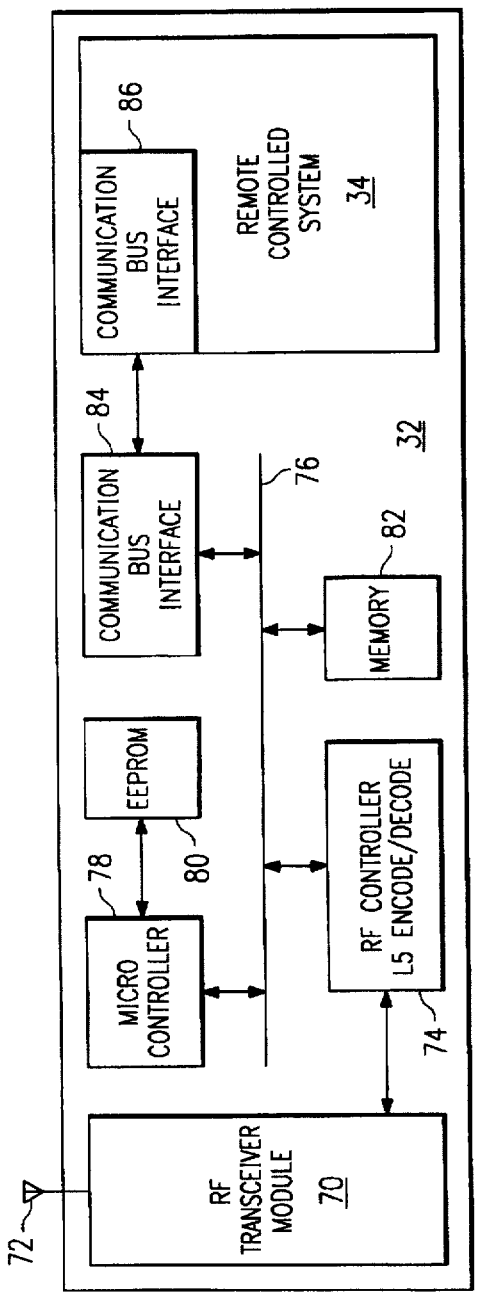
FIG. 3 is a block diagram of a remote system controller constructed according to the teachings of the present invention.

FIG. 3 is a schematic block diagram illustrating greater detail of the construction of remote system controller 32 and its interaction with remote-controlled system 34. Remote system controller 32 comprises an RF transceiver module 70 which receives and transmits signals from transmitter 16 through an antenna 72. The RF transceiver module 70 is coupled to an RF controller 74. RF controller 74 receives the messages from RF transceiver module 70 and decodes the messages placing them in digital form on an internal bus 76. In addition, RF controller 74 receives digital messages from internal bus 76 and encodes such messages for transmission by RF transceiver module 70.

Internal bus 76 is also coupled to a microcontroller 78 which may comprise a conventional 8-bit or 16-bit microcontroller circuit. Microcontroller 78 executes routines which are stored in an electrically erasable programmable read-only memory (EEPROM) 80 coupled to microcontroller 78. Microcontroller 78 also utilizes random access memory 82 which is coupled to internal bus 76 used to store messages and commands and to buffer data to and from computer bus interface. Remote system controller 32 communicates with remote-controlled system 34 through a communication bus interface 84 coupled to internal bus 76 and a communication bus interface 86 which communicates with remote-controlled system 34.

In operation, a command is received by RF transceiver module 70 through antenna 72 from transmitter 16. RF controller 74 decodes the command and transmits the decoded command to the microcontroller 78. Microcontroller 78 executes routines stored in EEPROM 80 and instructs the remote-controlled system 34 using commands placed on the internal bus 76 and transmitted through communication bus interface 84 and 86 to the remote-controlled system 34. Similarly, if the remote-controlled system 34 needs to send a message to a user of the communications system 10, the communication bus 84 receives the message from the remote-controlled system 34. The microcontroller 78 receives the message through the internal bus 76 and assembles an appropriate message to be transmitted. The message is then sent to the RF controller 74 where it is encoded and transmitted through the RF transceiver module 70 and antenna 72.

Subscriber Device Architecture

Figure 4:
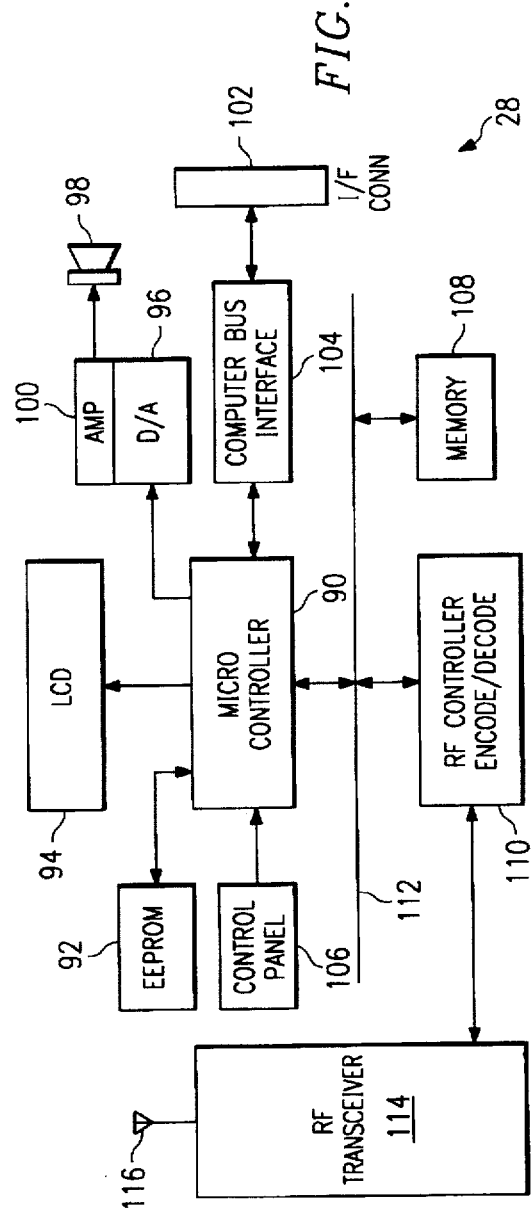
FIG. 4 is a block diagram of a subscriber device constructed according to the teachings of the present invention.

FIG. 4 is a schematic block diagram of the internal architecture of subscriber device 28. As discussed previously, subscriber device 28 has the ability to display data received from the RF transmission system 12. According to one embodiment of the present invention, the RF transmission system 12 may comprise the ReFLEX™/ InFLEXion™ system sold by Motorola, Inc. In addition, subscriber device 28 has the capability to play back voice messages received from RF transmission system 12. Subscriber device 28 comprises a microcontroller 90 which may comprise a conventional 8-bit or 16-bit microcontroller circuit. Microcontroller 90 executes routines which are stored in an electrically programmable read-only memory (EEPROM) 92. Microcontroller 90 transmits alphanumeric or data characters to be displayed on an LCD 94. In addition, microcontroller 90 transmits digitally-encoded sound to a digital-to-analog converter 96 which drives a speaker 98 using an amplifier 100. Microcontroller 90 also has the capability to communicate through a serial interface 102 through a computer bus interface 104. Serial interface 102 and computer bus interface 104 allow for subscriber device 28 to be used to directly communicate computer data received through serial interface 102 through the RF transmission system 12. Microcontroller 90 may receive commands from a user of subscriber device 28 through serial interface 102 and computer bus interface 104.

Microcontroller 90 receives commands from a user of subscriber device through a control panel 106. Control panel 106 may comprise, for example, a simple set of cursor control keys coupled with an "execute" key for a menu-driven system. In the alternative, control panel 106 may comprise a full alphanumeric keyboard and numeric keyboard if subscriber device 28 is a command driven system. Microcontroller 90 communicates with random access memory 108 and an RF controller circuit 110 through an internal bus 112. Random access memory 108 is used to store messages and to buffer data to and from serial interface 102. RF controller circuit 110 decodes and encodes messages to be sent to and received from an RF transceiver 114. RF transceiver 114 communicates with transmitter 16 and receiver 18 of RF transmission system 12 through an antenna 116.

In operation, the subscriber device 28 receives message transmissions from transmitter 16 using antenna 116 and RF transceiver 114. These messages are decoded by RF controller 110 and placed in memory 108. Microcontroller 90 then retrieves the messages from memory 108 and alerts the user of the subscriber device that the messages are present. The user can instruct the subscriber device 28 to play or display the message using control panel 106. If the message is a voice message, the microcontroller transmits the message through digital-to-analog converter 96 and amplifier 100 and plays the message using speaker 98. If the message is a data message, the microcontroller formats the message for display on LCD 94. In order to transmit either messages or commands generated by the user of subscriber device 28, the microcontroller receives such messages through control panel 106 or through serial interface 102 and computer bus interface 104. The microcontroller then transmits the appropriately-formatted messages to the RF controller 110 through the internal bus 112. RF controller 110 then encodes the messages appropriately and transmits the messages through RF transceiver 114 and antenna 116 to receiver 18.

Subscriber Notification

As discussed previously, the messaging system of the present invention enables the remote messaging system 30 to deposit copies of messages in the messaging gateway system 20. The messaging gateway system 20 can then construct pages that may be transmitted to the subscriber device 28 using the RF transmission system 12. In this manner, the user of the subscriber device 28 can have the entire message delivered or can be notified that he has a message waiting in the remote messaging system 30, ask that the message be forwarded to his subscriber device 28, and control the entire process by issuing commands from the subscriber device 28 that are relayed to the remote messaging system 30 by the messaging gateway system 20. Subscriber device 28 may also issue commands to messaging gateway system 20.

In order for this process to occur, the remote messaging system 30 first delivers a message deposit notification packet to the messaging gateway system 20. In the alternative, the remote messaging system 30 may deposit a copy of an entire message instead of a notification packet with the messaging gateway system 20. Due to the large amount of data required to encode the voice messages, the transfer of such messages between systems represents a significant expense. As such, sending only a notification packet eliminates the need to replicate the data of the message itself in the remote messaging system 30 and the messaging gateway system 20. However, under some circumstances, the convenience of foregoing the notification process and transmitting the entire message in the first instance may outweigh this expense.

If the entire message is sent to messaging gateway system 20 instead of merely a message notification, the messaging gateway system 20 stores the message and accepts commands from the subscriber device 28 as to the handling of the message. For example, in the case of a message that is to be forwarded to another user of remote messaging system 30, messaging gateway system 20 will construct a new message addressed to the other user and transmit the new message back to the remote messaging system 30 responsive to the commands to forward the message received from the subscriber device 28.

The copy of the message received from remote messaging system 30 is accepted by the interface control module 38 after it is converted by one of the protocol converters 40 through 52. The interface control module 38 then passes control to the database handler module 64. The database handler module 64 stores the notification packet in a packet folder associated with the subscriber using the file server module 62 and memory space on one of the disk drives 65 or 67.

As described previously, in the case where the entire message was sent instead of a notification packet, the database handler module 64 would see to the storage of the entire message within the subscriber's message folder. After the message or the notification packet is stored, the database handler module 64 notifies the transaction control module 54 of the received packet or message. The transaction control module 54 then assigns a transaction number to the transaction and updates a transaction table reflecting the start of the message deposit notification phase of the transaction. Transaction control module 54 then stores a detailed billing record in a billing folder associated with a subscriber using the file server module 62. Transaction control module 54 then passes control to the action processor module 58.

The action processor module 58 retrieves the message or notification packet and decodes the notification packet. Action processor module 58 then instructs the message construction module 56 to create a page for the subscriber containing information about the message deposited in the remote messaging system 30. The message construction module 56 creates a notification page that includes response options based on the information obtained from the deposited message or the notification packet and information defined in the subscriber's portfolio database. In the case where an entire message is sent as opposed to a notification, the message construction module 56 will construct a page from the deposited message and add response options based on information obtained from the message and information defined in the subscriber's portfolio database.

The message construction module 56 then notifies the transaction control module 54 that the notification page or message page is ready for delivery to the subscriber device 28. The transaction control module 54 then assigns a page transaction number to the notification page and updates the transaction table reflecting the start of the paging session. The transaction control module 54 then passes control to the interface control module 38. Interface control module 38 delivers a copy of the notification page or message page to the RF transmission system 12 either directly or through the paging terminal 22.

The RF control system 14 within RF transmission system 12 delivers the notification page or message page to the subscriber device 28 through the transmitter 16 and receives acknowledgment of the successful delivery from the subscriber device 28 through the receiver 18. Upon successful delivery, the RF system 12 delivers an acknowledgment packet to the messaging gateway system 20 either directly or through the paging terminal 22.

The interface control module 38 accepts the acknowledgment packet and passes control to the database handler module 64. The database handler module 64 stores the acknowledgment packet in the subscriber's packet folder and notifies the transaction control module of the received acknowledgment packet. The transaction control module 54 then updates the transaction table reflecting the end of the paging session and updates the billing records stored in the subscriber's billing folder. At this point, the notification page or message page has been successfully delivered to the subscriber and the subscriber now has the notification page or message page with a plurality of options from which he can select.

The subscriber is notified that the notification page or message page exists by a "beep" issued from speaker 98 in the subscriber device 28 or by other suitable means such as vibration of the subscriber device 28. The subscriber then views the notification page or message page and his response options on LCD 94 of subscriber device 28. The subscriber selects a response to the notification or message by selecting from options listed on LCD 94 using control panel 106. Microcontroller 90 assembles a response packet responsive to the subscriber's choices and transmits the response packet through RF controller 110, RF transceiver 114 and antenna 116. The response packet is received by the RF transmission system 12 through receiver 18 and the RF control system 14 delivers the response packet to the messaging gateway system 20 either directly or through paging terminal 22.

The interface control module 38 accepts the response packet and passes control to the database handler module 64. The database handler module 64 then stores the response packet in the subscriber's packet folder using file server module 62 and notifies the transaction control module 54 of the received response packet. The transaction control module 54 updates the transaction table reflecting the start of a response phase of a transaction and the end of the message deposit notification or message delivery phase of the transaction. Transaction control module 54 then stores a detailed billing record in the subscriber's billing folder using file server module 62. Control is then passed to the action processor module 58.

The action processor module 58 retrieves and decodes the subscriber response packet and instructs the message construction module 56 to create a command packet instructing remote messaging system 30 to perform the actions requested by the subscriber. Control then passes to the message construction module 56. The message construction module 56 then constructs a command packet responsive to the subscriber's request and notifies the transaction control module 54 that the packet is ready for delivery to the remote messaging system 30. The action processor module 58 may instruct messaging gateway system 20 to take action in the case of the entire message being stored in messaging gateway system 20, and only notify remote messaging system 30 that the message was received and acknowledged by the subscriber.

The transaction control module 54 then assigns a command transaction number to the command packet and updates the transaction table. Control then passes to the interface control module 38 which delivers the command packet to the remote messaging system 30 through an appropriate protocol converter 40 through 52.

The remote messaging system 30 accepts and decodes the command packet to determine which actions it is to perform. Upon successful completion of the command or commands, the remote messaging system 30 delivers an acknowledgment that the commands have been completed to the messaging gateway system 20. In cases where the subscriber has asked to view or listen to the actual message, the acknowledgment from remote messaging system 30 may also include a copy of the message itself.

The interface control module 38 accepts and receives the acknowledgment packet through one of the protocol converters 40 through 52 and passes control to the database handler module 64. The database handler module 64 stores the acknowledgment packet in the subscriber's packet folder and notifies the transaction control module 54 of the received packet. Transaction control module 54 updates the transaction table reflecting the end of the command transaction and of the response phase of transaction and stores a detailed billing records in the subscriber's billing folder. Control then passes to the action processor module 58.

The action processor module 58 decodes the command complete acknowledgment packet and instructs the message control module 56 to create a page containing the command status information for the subscriber or to create a message page with response options in the case where the message is requested. The action processor module 58 then passes control to the message construction module which creates the page and notifies the transaction control module 54 that the page is ready for delivery to the subscriber device 28.

The transaction control module 54 assigns a page transaction number to the outgoing page and updates the transaction table reflecting the start of a paging session. Control then passes to the interface control module 38 which delivers a copy of the page to the RF transmission system 12 either directly to the RF control system 14 or through the paging terminal 22.

The RF transmission system 12 delivers the page to the subscriber device 28 using the RF control system 14 and transmitter 16. Upon successful delivery of the page, subscriber device 28 transmits an acknowledgment to the receiver 18. The RF control system 14, upon receiving such acknowledgment, delivers an acknowledgment packet to the messaging gateway system 20 either directly or through paging terminal 22. The interface control module 38 accepts the acknowledgment packet and passes control to the database handler module 64. The database handler module stores the acknowledgment packet in the subscriber's packet folder and notifies the transaction control module 54 of the received packet. The transaction control module 54 then updates the transaction table reflecting the end of the paging session, the termination of RF usage on the forward channel and the end of the entire transaction. The transaction control module 54 then stores a billing record in the subscriber's billing folder using file server module 62.

As discussed previously, in one typical circumstance, the subscriber will first be notified of one or more messages in the remote messaging system 30 through a notification page. The subscriber will be presented with a menu identifying the existing messages and giving the subscriber options on what to do with each of the messages. At this point, the subscriber has the choice of requesting retrieval of the messages using his subscriber device 28 or retrieving his messages using other means. According to one embodiment of the present invention, the message notification packet includes information as to the size of the message. In this manner, the subscriber can decide whether or not it is economical to utilize the messaging system 10 to retrieve such a message or whether or not resources are adequate to retrieve such a message.

As discussed previously, any command that could be issued directly to remote messaging system 30 can also be issued using messaging system 10. For example, the subscriber may choose to save, delete, forward, reply, or perform other actions in response to the receipt of a message. Each of these actions is encoded in a command packet which is delivered as described through the messaging gateway system 20 to the remote messaging system 30.

Subscriber-Initiated Commands to Remote Units

According to the teachings of the present invention, the subscriber using subscriber device 28 can initiate commands controlling a remote-controlled system 34 using a remote system controller 32. The operation of this system first depends on whether or not the menu of various commands available to a particular subscriber is stored in the subscriber device 28. If such commands are stored in the subscriber device 28, the list of potential commands can be displayed in a menu fashion and the subscriber can select the desired command using control panel 106. However, it may be desired to be able to store the potential commands within the messaging gateway system 20 in order that the commands can be more easily updated.

According to this embodiment, a subscriber would be presented with a "portfolio" option programmed in subscriber device 28 on a menu within the subscriber device 28. The subscriber would select the portfolio option and then command the subscriber device 28 to transmit. The subscriber device 28, using microcontroller 90, would then assemble a request packet and then transmit the request packet to the RF transmission system through the receiver 18. The request packet is an unsolicited message originating from the subscriber device 28 at the subscriber's command which contains a unique transaction identification that is recognized by the messaging gateway system 20 as a request for the subscriber's portfolio menu.

The RF control system 14 recognizes the transaction I.D. within the request packet as indicating the messaging gateway system 20 as the intended recipient. This transaction I.D. is programmed into subscriber device 28 or entered into it via the control panel 106 or serial interface 102. As such, the RF control system 14 delivers the request packet to the messaging gateway system 20 either directly or through paging terminal 22. The interface control module 38 accepts the request packet and passes control to the database handler module 64. The database handler module 64 stores the request packet in the subscriber's packet folder using file server module 62 and notifies the transaction control module 54 of the received packet.

The transaction control module 54 recognizes the special request packet transaction I.D. and assigns a new transaction number to the transaction. The transaction control module 54 then updates the transaction table reflecting the start of a subscriber request phase of a transaction and stores the detailed billing records reflecting the necessity of an RF transmission. The transaction control module 54 then passes control to the action processor module 58. The action processor module 58 decodes the request packet and instructs the message construction module 56 to create a page for the subscriber containing the subscriber's portfolio menu.

According to one embodiment of the present invention, the portfolio menu is a page which comprises a list of customized response options that are defined as the type of services provided to a particular subscriber. The message construction module 56 creates the portfolio menu page and notifies the transaction control module 54 that the page is ready for delivery to the subscriber device 28. The transaction control module 54 assigns a page transaction number to the portfolio menu page and updates the transaction table reflecting the start of a paging session.

Control is then passed to the interface control module 38 which delivers the portfolio menu page to the RF transmission system 12 either directly or through paging terminal 22.

The RF transmission system 12 delivers the portfolio menu page to the subscriber device 28 through the transmitter 16. Upon successful delivery, the subscriber device acknowledges receipt of the portfolio menu page by issuing an acknowledgement which is received by receiver 18. The RF control system 14 then delivers an acknowledgment packet to the messaging gateway system 20 either directly or through paging terminal 22. Interface control module 38 accepts the acknowledgment packet and passes control to the database handler module 64. The database handler module 64 stores the acknowledgment packet in the subscriber's packet folder and notifies the transaction control module 54 of the received acknowledgment packet.

Transaction control module 54 updates the transaction table reflecting the end of the paging session. The transaction control module 54 then stores a detailed billing record in the subscriber's billing folder using file server module 62.

Upon receipt of the portfolio menu page, the subscriber is notified of the receipt of the page by an electronic tone or other suitable means. The microcontroller 90 within subscriber device 28 displays the portfolio menu options on LCD 94. The subscriber selects a response from the options listed in the portfolio menu using control panel 106 or serial port 102 and computer bus interface 104. The microcontroller 90 assembles a response packet including information identifying the selected response and delivers the response packet to the RF transmission system 12 through receiver 18. The RF control system 14 delivers the response packet to the messaging gateway system 20 either directly or through paging terminal 22.

The interface control module 38 within messaging gateway system 20 accepts the response packet and passes control to the database handler module 64. The database handler module 64 stores the response packet in the subscriber's packet folder using file server module 62 and notifies the transaction control module 54 of the received response packet.

The transaction control module 54 updates the transaction table reflecting the start of a response phase of a transaction and the end of the subscriber request phase of the transaction. The transaction control module 54 then stores a detailed billing record in the subscriber's billing record utilizing file server module 62. Control is then passed to the action processor module 58 which decodes the response packet and instructs the message construction module to create either a command packet or a page based upon the options selected by the subscriber. Control is then passed to the message construction module 56 that creates a command packet or a page for delivery to at least three types of destinations. The command packet or page may first be intended for use by the remote-controlled system 34 using the remote system controller 32. Secondly, as previously described, the command packet could be intended for delivery to a remote messaging system such as remote messaging system 30. In this case, the command packet would include a command intended to manipulate, for example, a voice mailbox within remote messaging system 30. The third possible destination is another subscriber device. In this manner, the subscriber using subscriber device 28 can create a message or page and transmit it to another subscriber device using RF transmission system 12 and messaging gateway system 20.

The transaction control module 54 assigns a command transaction number to any command packets for remote messaging systems such as remote messaging system 30 or page transaction numbers for pages intended for remote-controlled system 34 or other subscriber devices. The transaction control module 54 then updates the transaction table reflecting the start of a command transaction or the start of a paging session. Transaction control module 54 then passes control to the interface control module 38. The interface control module then delivers the command packet to remote messaging system 30 through the appropriate protocol converter 40 through 52. In the alternative, the interface control module 38 delivers a copy of the assembled page to the RF transmission system 12 by directly delivering the page to RF control system 14 or by delivering the page to RF control system 14 through paging terminal 22.

In the case of a command packet, the remote messaging system 30 accepts and decodes the command packet and performs the requested action.

In the case of an assembled page, the RF transmission system 12 delivers the requested page to the remote system controller 32 utilizing transmitter 16. Alternatively, the RF transmission system 12 delivers the assembled page to another subscriber device using transmitter 16. Upon successful delivery to either location, the remote system controller 32 or the other subscriber device will transmit an acknowledgment to receiver 18. The RF control system 14 will then deliver an acknowledgment packet to the messaging gateway system 20 either directly or through paging terminal 22.

The interface control module 38 accepts the acknowledgment packet and passes control to the database handler module 64. The database handler module 64 stores the acknowledgment packet in the subscriber's packet folder and notifies the transaction control module 54 of the received packet.

The transaction control module 54 updates the transaction table reflecting the end of the paging session. The transaction control module 54 then stores a detailed billing record in the subscriber's billing folder using file server module 62.

Upon the successful completion of a command, either the remote messaging system 30 or the remote system controller 32 will generate a command complete notification packet and transmit the command complete notification packet to the messaging gateway system 20 either through a protocol converter 40 through 52 in the case of the remote messaging system 30 or through the RF transmission system 12 in the case of the remote system controller 32.

In either circumstance, the interface control module 38 accepts the command complete notification packet and passes control to the database handler module 64. The database handle module 64 stores the command complete 5 notification packet in the subscriber's packet folder utilizing file server module 62 and notifies the transaction control module 54 of the received command complete notification packet.

The transaction control module 54 updates the transaction table reflecting the end of the response phase of a transaction and the termination of RF usage on the reverse channel. The transaction control module 54 also updates the transaction table to reflect the completion of a command transaction and the start of a second response phase of a transaction. The transaction control module 54 stores a detailed billing record in the subscriber's billing folder, utilizing file server module 62. Control then passes to the action processor module which decodes the command complete notification packet and instructs the message construction module 56 to create a page for delivery to the subscriber device 28 informing the subscriber of the command status.

The message construction module 56 then creates a page and notifies the transaction control module that the page is ready for delivery to the subscriber device 28. The transaction control module 54 assigns a page transaction number to the page and updates the transaction table to reflect the start of a paging session. Control then passes to the interface control module 38.

The interface control module 38 delivers a copy of the page to the RF transmission system 12 either directly or through paging terminal 22. The RF transmission system 12 delivers the page to the subscriber device 28 through transmitter 16. Upon receipt of the page, the subscriber device 28 generates an acknowledgment and transmits the acknowledgment to receiver 18. Upon receipt of the acknowledgment, the RF control system 14 delivers an acknowledgment packet to the messaging 5 gateway system 20 either directly or through paging terminal 22.

Subscriber device 28 notifies the subscriber of the existence of the command complete page by displaying the command complete notification on the LCD 94. This notification may be preceded by a suitable tone or vibration to alert the subscriber.

The interface control module 38 accepts the acknowledgment packet and passes control to the database handler module 64. The database handler module 64 stores the acknowledgment packet in the subscriber's packet folder using file server module 62 and notifies the transaction control module 54 of the received packet. The transaction control module 54 updates the transaction table to reflect the end of the paging session. The transaction control module 54 also updates the transaction table to reflect the end of the second response phase of the transaction, and the end of the entire transaction. The transaction control module 54 then stores a detailed billing record in the subscriber's billing folder utilizing file server module 62.

Utilizing the unique capabilities of messaging gateway system 20, a subscriber can choose from a portfolio of options programmed into messaging gateway system 20 to generate pages to other subscribers, to command remote units which are controlled by system controllers such as remote system controller 32, or to command remote messaging systems such as remote messaging system 30. In this manner, a subscriber device such as subscriber device 28 allows not only for the communication of paging messages to the subscriber but also for the generation of messages and the remote control of a variety of systems.

Voicemail System Interface

Utilizing the systems and methods of operation previously described, the messaging gateway system 20 within messaging system 10 provides for both the delivery of messages within remote messaging system 30 to subscriber device 28 and for the control of the remote messaging system 30 remotely using the subscriber device 28.

As described previously, the messaging gateway system 20 not only accepts copies of voice messages from disparate voicemail systems using industry standard message transfer protocols such as AMIS-Digital or AMIS-Analog or vendor-specific protocols, it also accepts message notification packets received from the remote messaging system such as remote messaging system 30. The message notification packets may include the identification of the originator in either text or voice form, the identification of the message priority, the date and time stamp of the message deposit, the identification of the originating telephone number of the message, the message sequence number, the length of the message in seconds, the size in bytes of the compressed digitized message file, and the identification of the transferring voicemail system. Because other types of messaging systems such as electronic mail or facsimile machines may also communicate with messaging gateway system 20, the message type is also included in the notification packets.

When a copy of a new message is received from a remote voicemail system, such as remote messaging system 30, the messaging gateway system 20 provides either the message with response options or message notification with response options to the subscriber using the techniques described previously. The notification page includes all or a portion of the previously mentioned information describing the message. Alternatively, the notification page could include a selected subset of the information depending upon the capabilities of the subscriber device 28 or the desires of a particular subscriber. In addition, depending on the capabilities of the subscriber device 28 and the desires of the subscriber, the notification may comprise the actual message with the addition of subscriber response options.

According to one embodiment of the present invention, a subscriber may choose to receive message notifications regarding certain types of messages and the message itself for other types of messages. For example, messages from a particular source or of a particular urgency would not require a message notification packet but would merely be delivered in the first instance. However, messages of normal urgency or messages from non-selected sources would first generate a message notification packet to the subscriber to allow the subscriber the option of retrieving the messages using other means or disregarding the message altogether.

In addition, a subscriber may choose for economic reasons to always receive a message notification packet when a message is of a particular size. For example, a subscriber could specify that if the size of the digitized message file exceeds a certain parameter, a message notification packet only is to be sent. But, if the message file is smaller than the same parameter or a different parameter, the message itself is to be sent in the first instance. In this manner, a subscriber can maximize the economic utility of the message delivery capabilities of messaging system 10.

As described previously, the messaging gateway system 20 utilizes protocol converters 40 through 52 to accept a variety of message transfer protocols and to translate these protocols into formats associated with the RF transmission system 12. The transmission format may comprise a conventional paging format such as Motorola, Inc.'s InFLEXion™ format for delivery to voice paging devices or ReFLEX™ format for delivery of alphanumeric/data to paging devices. In the alternative, the transmission format could comprise a conventional multimedia format such as the .WAV file format for delivery to multimedia personal computers or personal communicators.

The messaging gateway system 20 supports the capability to instruct remote messaging systems such as remote messaging system 30 to perform a variety of actions on messages. For example, the remote messaging system 30 may be instructed to save a message that has been delivered to a subscriber device 28. The subscriber using subscriber device 28 can also reply to a message by entering a text message into the subscriber device 28 using the control panel 106 or serial port 102 and computer bus interface 104. This text is then transmitted to the remote messaging system 30 after it has been converted to speech in a conventional text-to-speech converter by the messaging gateway system 20. Similarly, the remote messaging system 30 may be instructed to redirect a message which may include a similar text annotation. As before, the text annotation is entered by the user of subscriber device 28 using control panel 106 or through a computer connected to serial interface 102 on subscriber device 28 and is converted to a digitized speech message prior to delivery to the remote messaging system 30 by the messaging gateway system 20.

As discussed previously, a subscriber using subscriber device 28 can instruct the messaging gateway system 20 and the remote messaging system 30 to send a message to the subscriber device 28 after a message notification packet has been received. In addition, a subscriber using subscriber device 28 can create a new message by entering text using control panel 106 or by using a computer connected through serial port 102 on subscriber device 28. The message can also similarly be addressed. The text message is then converted to a voice message prior to delivery to the remote messaging system 30.

The subscriber using subscriber device 28 can also instruct the messaging gateway system 20 to hold all voice messages until further notice. In this state, no messages or message notifications will be sent to the subscriber device 28. The subscriber using subscriber device 28 can also instruct the messaging gateway system 20 to remove the hold restriction by issuing a transmit command.

According to an alternate embodiment of the present invention, a subscriber using subscriber device 28 can place restrictions on the delivery of messages or notifications to a subscriber device 28. For example, pages to subscriber device 28 may be held during specified hours during the day or night. A restrict command can be used by the subscriber to instruct the messaging gateway system 20 to invoke the predefined restrictions. In addition, restrictions may include message filtering based on urgency or source of the message. For example, predefined restrictions can be put in place such that only urgent messages or messages from a particular source are transmitted to the subscriber device 28.

It should be understood that although the present invention, especially subscriber device 28, is described as comprising both voice playback and data display capability, the scope of the present invention is not limited to this sort of subscriber device. For example, the present invention may also be used with subscriber devices that have only voice playback capability or only data display capability.

Although the present invention has been described in detail, it should be understood that various changes, modifications, alterations, and substitutions may be made to the systems and methods of operation described herein without departing from the spirit and scope of the present invention which is solely defined by the appended claims.

What is claimed is:

1. A messaging system, comprising:
   a messaging gateway operable to receive messages from a remote messaging system and to construct transmittable messages including portions of the messages received from the remote messaging system;
   an RF transmission system coupled to the messaging gateway and operable to receive the transmittable messages from the messaging gateway system;
   a subscriber device operable to communicate using radio frequency transmissions with the RF transmission system and operable to receive the transmittable messages including portions of the messages received from the remote messaging system through the messaging gateway system and the transmission system;
   the subscriber device operable to generate commands and to transmit the commands to the RF transmission system;
   the RF transmission system operable to direct the commands from the subscriber device to the messaging gateway; and
   the messaging gateway system operable to translate the commands into a protocol understood by the remote messaging system and to transmit the translated command to the remote messaging system such that a user of the subscriber device can control the operation of the remote messaging system utilizing commands transmitted to the remote messaging system through the RF transmission system and the messaging gateway system.

2. The messaging system of claim 1 and further comprising:
   a remote-controlled system coupled to a remote system controller;
   the remote system controller operable to communicate using radio frequency transmissions with the RF transmission system;
   the subscriber device operable to generate remote system commands and to transmit the remote system commands to the messaging gateway system through the RF transmission system;
   the messaging gateway system operable to decode the remote system commands and to generate messages to the remote system controller responsive to the remote system command; and the remote system controller operable to control the remote-controlled system responsive to the commands received from the messaging gateway system.

3. The messaging system of claim 1 wherein the messaging gateway system is operable to assemble a message notification transmission responsive to the receipt of a message from a remote messaging system and transmit the message notification transmission to the subscriber device through the RF transmission system;

the subscriber device operable to receive and display information responsive to the receipt of the message notification transmission and to generate a message response transmission responsive to a selection of a user of the subscriber device; and the messaging gateway system operable to receive the message response transmission and to instruct the remote messaging system to transmit a message to the messaging gateway system for transmission to the subscriber device responsive to the receipt of the message response transmission.

4. The messaging system of claim 1 wherein the subscriber device is operable to generate and transmit a request message requesting the subscriber's portfolio menu;

the messaging gateway system operable to receive the request message and to transmit a menu message to the subscriber device using the RF transmission system; and the subscriber device operable to receive the menu message and to display a menu of options to a user of the subscriber device responsive to the receipt of the menu message.

5. The messaging system of claim 1 wherein the messaging gateway system comprises:

a plurality of protocol converter modules coupled to an interface control module, the protocol converter modules operable to receive messages from remote messaging systems in protocols associated with the remote messaging systems and to convert the protocols to an internal message protocol understood by the interface control module;

a transaction control module operable to control and log transactions performed by the messaging gateway system;

a database handler module operable to organize messages and subscriber information used by the messaging gateway system;

a file server module operable to store messages and information processed by the messaging gateway system;

a message construction module operable to construct messages and commands for transmission using the RF transmission system and to construct command messages to be transmitted to remote messaging systems; and an action processor module operable to decode packets and to instruct the remaining modules on actions to perform based on these packets.

6. A messaging system, comprising:

a messaging gateway operable to receive messages from a remote messaging system and to construct transmittable messages including portions of the messages received from the remote messaging system;

an RF transmission system coupled to the messaging gateway and operable to receive the transmittable messages from the messaging gateway system;

a subscriber device operable to communicate using radio frequency transmissions with the RF transmission system and operable to receive the transmittable messages including portions of the messages received from the remote messaging system through the messaging gateway system and the RF transmission system;

the subscriber device operable to generate commands and to transmit the commands to the RF transmission system;

the RF transmission system operable to direct the commands from the subscriber device to the messaging gateway system;

the messaging gateway system operable to translate the commands into a protocol understood by the remote messaging system and to transmit the translated command to the remote messaging system such that a user of the subscriber device can control the operation of the remote messaging system utilizing commands transmitted to the remote messaging system through the RF transmission system and the messaging gateway system;

a remote-controlled system coupled to a remote system controller;

the remote system controller operable to communicate using radio frequency transmissions with the RF transmission system;

the subscriber device operable to generate remote system commands and to transmit the remote system commands to the messaging gateway system through the RF transmission system;

the messaging gateway system operable to decode the remote system commands and to generate messages to the remote system controller responsive to the remote system command and the remote system controller operable to control the remote-controlled system responsive to the commands and to the transmissions received from the messaging gateway system.

7. The messaging system of claim 6 wherein the messaging gateway system is operable to assemble a message notification transmission responsive to the receipt of a message from a remote messaging system;

the messaging gateway system further operable to transmit the message notification transmission to the subscriber device through the RF transmission system;

the subscriber device operable to receive and display information responsive to the receipt of the message notification transmission and to generate a message response transmission responsive to a selection of a user of the subscriber device; and the messaging gateway system operable to receive the message response transmission and to instruct the remote messaging system to transmit a message to the messaging gateway system for transmission to the subscriber device responsive to the receipt of the message response transmission.

8. The messaging system of claim 7 wherein the subscriber device is operable to generate a request message utilizing a unique transaction identifier programmed into the subscriber device or entered into the subscriber device;

the messaging gateway system operable to receive the request message and recognize the unique transaction I.D. as a request and to transmit a menu message to the subscriber device using the RF transmission system; and the subscriber device operable to receive the menu message and to display a menu of options to a user of the subscriber device responsive to the receipt of the menu message.

9. A method of processing messages comprising the steps of:

receiving at a messaging gateway a message notification from a remote messaging system;

transmitting the message notification to a subscriber device through an RF transmission system;

transmitting a deliver message command in response to the message notification from the subscriber device to the messaging gateway through the RF transmission system;

transmitting a command to the remote messaging system from the messaging gateway requesting the message associated with the message notification;

receiving at the messaging gateway the message from the remote messaging system;

transmitting the message to the subscriber device through the RF transmission system;

transmitting a command associated with the message to the messaging gateway from the subscriber device through the RF transmission system; and transmitting a command message including the command from the subscriber device to the remote messaging system through the messaging gateway.

10. The method of claim 9 and further comprising the step of:

receiving at the messaging gateway system a command acknowledgment message from the remote messaging system;

transmitting the command acknowledgment to the subscriber device through the RF transmission system; and displaying the command acknowledgment to a user of the subscriber device.

11. The method of claim 9 and further comprising the step of:

generating at the subscriber device a message including a remote system command;

transmitting the remote system command to the messaging gateway system through the RF transmission system from the subscriber device;

transmitting a message from the message gateway system to a remote system controller through the RF transmission system instructing the remote system controller to perform the actions instructed by the command received from the subscriber device; and controlling a remote-controlled system using the remote system controller responsive to the message received from the messaging gateway system.

12. A method of processing voice messages comprising the steps of:

receiving in a messaging gateway a voice message notification;

transmitting a page including the voice message notification to a subscriber device through a transmission system;

transmitting a voice message send command from the subscriber device to the messaging gateway;

retrieving the voice message from the remote messaging system into the messaging gateway;

transmitting the voice message from the messaging gateway to the subscriber device through the transmission system;

transmitting a command from the subscriber device to the messaging gateway associated with the processing of the voice message; and transmitting the command from the messaging gateway to the remote messaging system such that the user of the subscriber device can remotely command the operation of the remote messaging system.

13. The method of claim 12 wherein the step of transmitting a command from the subscriber device to the messaging gateway system comprises the step of transmitting a command instructing the remote voicemail system to save the message.

14. The method of claim 12 wherein the step of transmitting a command from the subscriber device to the messaging gateway system comprises the step of transmitting a command instructing the remote voicemail system to redirect the message and wherein the command message also includes an address of the intended recipient and a text message to be included with the redirected message.

15. The method of claim 12 wherein the step of transmitting a command from the subscriber device to the messaging gateway system comprises the step of transmitting a command instructing the remote voicemail system to reply to the message and wherein the reply message also includes a text message to be included and sent to the intended recipient of the message.

16. A method of processing voice messages comprising the steps of:

receiving in a messaging gateway a voice message from a remote voice message system coupled to the messaging gateway system;

transmitting a page including the voice message notification page to a subscriber device through a transmission system;

transmitting a voice message deliver command from the subscriber device to the messaging gateway;

transmitting the voice message from the messaging gateway to the subscriber device through the transmission system; and transmitting a command from the subscriber device to the messaging gateway associated with the processing of the voice message.

17. The method of claim 16 wherein the step of transmitting a command from the subscriber device to the messaging gateway system comprises the step of transmitting a command instructing the messaging gateway system to instruct the remote voice messaging system to save the message.

18. The method of claim 16 wherein the step of transmitting a command from the subscriber device to the messaging gateway system comprises the step of transmitting a command instructing messaging gateway system to redirect the message and wherein the command message also includes an address of the intended recipient and a text message to be included with the redirected message.

19. The method of claim 16 wherein the step of transmitting a command from the subscriber device to the messaging gateway system comprises the step of transmitting a command instructing the messaging gateway system to reply to the message and wherein the reply message also includes a text message to be included and sent to the intended recipient of the message.

* * * * *

(12) EX PARTE REEXAMINATION CERTIFICATE (7399th)

United States Patent
Beletic et al.

(10) Number: US 5,706,211 C1
(45) Certificate Issued: Mar. 9, 2010

(54) MESSAGE COMMUNICATIONS SYSTEM

(75) Inventors: John D. Beletic, Dallas, TX (US); Vick T. Cox, Plano, TX (US); John A. Davis, Plano, TX (US)

(73) Assignee: Motorola, Inc., Schaumburg, IL (US)

Reexamination Request:
No. 90/010,280, Sep. 16, 2008

Reexamination Certificate for:
| Patent No.: | 5,706,211 |
|---|---|
| Issued: | Jan. 6, 1998 |
| Appl. No.: | 08/396,499 |
| Filed: | Mar. 2, 1995 |

(51) Int. Cl.
*H04Q 7/10* (2006.01)
*H04Q 7/06* (2006.01)

(52) U.S. Cl. .................. 709/206; 340/7.1; 340/7.21; 340/7.43; 379/88.12; 379/88.15; 379/88.22; 455/466

(58) Field of Classification Search .................. None
See application file for complete search history.

(56) References Cited

U.S. PATENT DOCUMENTS

| 5,327,486 A | 7/1994 | Wolff et al. |
| 5,509,000 A | 4/1996 | Oberlander |
| 5,742,905 A | 4/1998 | Pepe et al. |

OTHER PUBLICATIONS

Michael W. Powell; Alphanumeric Pager With Integral Access Controler; Technical Developments; vol. 24; Mar. 1995, Schaumburg, IL p. 149–150; XP000500383.

McCulley et al; Disbributed Real Time Signal Proccessing for Cellular and Paging Traffic Anaylsis, Fraud Detection, and Intelligent Wireless Network Control; Mobile and Portable Radio Research Group, Bradley Department of Electrical Engineering; May 18, 1993; Blacksburg, VA p. 891–896; XP000393324.

Polilli, S.; Motorola Envisions Connecting Wireless Technologies to LANs; vol. 15, Issue 47, Nov. 22, 1993, 2 Pgs.

Kramer et al., Use of Two–Way Wireless Messaging for Personal Telephone Management, 2nd International Conference on Universal Personal Communications. Conference Record., pp. 743–8 vol. 2. (1993).

*Primary Examiner*—Alexander J Kosowski

(57) ABSTRACT

A messaging system (10) is provided that comprises an RF transmission system (12). The RF transmission system (12) comprises an RF control system (14) which receives message traffic from a messaging gateway system (20). The messaging gateway system (20) receives messages in a variety of protocols from remote messaging system (30). The messaging gateway system (20) translates the messages received from remote messaging system (30) and constructs messages to be delivered to subscriber devices (28) through the RF transmission system (12). A subscriber device (28) can issue commands that are transmitted to the remote messaging system (30) or to remote system controller (32) controlling a remote-controlled system (34).

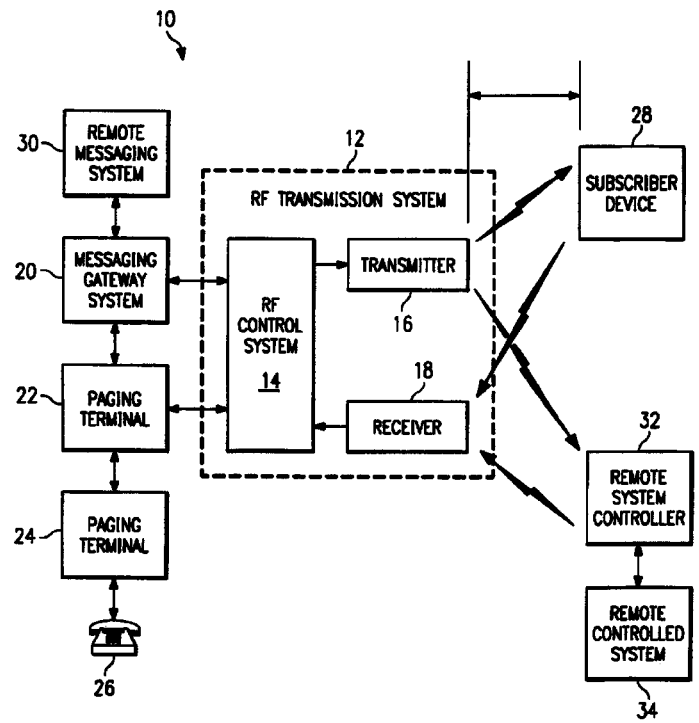

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claim 4, dependent on an amended claim, is determined to be patentable.

New claim 20 is added and determined to be patentable.

Claims 2–3 and 5–19 were not reexamined.

1. A messaging system, comprising:
    a messaging gateway operable to receive messages from a remote messaging system, *automatically,* and to construct transmittable messages including portions of the messages received from the remote messaging system;
    an RF transmission system coupled to the messaging gateway and operable to receive the transmittable messages from the messaging gateway system;
    a subscriber device operable to communicate using radio frequency transmissions with the RF transmission system and operable to receive the transmittable messages including portions of the messages received from the remote messaging system through the messaging gateway system and the transmission system;
    the subscriber device operable to generate commands and to transmit the commands to the RF transmission system;
    the RF transmission system operable to direct the commands from the subscriber device to the messaging gateway; and
    the messaging gateway system operable to translate the commands into a protocol understood by the remote messaging system and to transmit the translated command to the remote messaging system such that a user of the subscriber device can control the operation of the remote messaging system utilizing commands transmitted to the remote messaging system through the RF transmission system and the messaging gateway system.

20. *The messaging system of claim 1 wherein the messaging gateway is further operatively connected to a telephone in addition to receiving messages from the remote messaging system.*

\* \* \* \* \*